ELECTROSTATIC MEMORY SYSTEM

Original Filed Feb. 4, 1957 3 Sheets-Sheet 1

INVENTOR.
FREDERICK A. SCHWERTZ
BY Stanley Z. Cole
ATTORNEYS

ELECTROSTATIC MEMORY SYSTEM

Original Filed Feb. 4, 1957 3 Sheets-Sheet 2

INVENTOR.
FREDERICK A. SCHWERTZ
BY Stanley Z. Cole
ATTORNEYS

Sept. 7, 1965 F. A. SCHWERTZ 3,205,484

ELECTROSTATIC MEMORY SYSTEM

Original Filed Feb. 4, 1957 3 Sheets-Sheet 3

INVENTOR.
FREDERICK A. SCHWERTZ
BY Stanley Z. Cole
ATTORNEYS

United States Patent Office 3,205,484
Patented Sept. 7, 1965

3,205,484

ELECTROSTATIC MEMORY SYSTEM

Frederick A. Schwertz, Pittsford, N.Y., assignor to Xerox Corporation, a corporation of New York Original application Feb. 4, 1957, Ser. No. 638,067, now Patent No. 3,050,580, dated Aug. 21, 1962. Divided and this application Oct. 19, 1961, Ser. No. 146,246
4 Claims. (Cl. 340—173)

The present invention relates to electrostatic techniques for indicating, recording and visually displaying symbolic or pictorial intelligence. This is a divisional application of copending application Serial No. 638,067, filed February 4, 1957, now Patent No. 3,050,580 and bearing the same title.

An object of this invention is to provide a facsimile system for transmitting and recording images at high speed, the system including an electrostatic facsimile recording apparatus. A significant aspect of the invention resides in the fact that the surface to be recorded is scanned electrostatically without the use of mechanical expedients, thereby making possible an appreciable increase in the speed of recording. Another important feature of the invention involves the use of novel circuits for synchronizing the operation of the electrostatic recorder with the scanner for the original picture whereby electronic scanning of the recording surface is synchronized by the mechanical scanning of the original picture.

Another object of the invention is to provide an electrostatic memory device for storing digital information. A memory device in accordance with the invention obviates the need for cathode-ray scanning tubes characteristic of prior art devices and effects recording and read-back of information in an air medium. A salient feature of the invention resides in the use of electrode heads adapted both to record electrostatically on an insulating surface and to read out electrostatically-recorded information.

Still another object of the invention is to provide in an electrostatic memory device for recording on a photoconductive surface a light system for reading out electrostatically recorded information.

It is also an object of the invention to provide an electrostatic apparatus adapted to produce overlapping electrostatic images whereby multiple-color effects may be obtained.

For a better understanding of the invention as well as other objects and further features thereof, reference is had to the following detailed description to be read in conjunction with the accompanying drawings wherein like components in the several views are represented by like reference numerals.

In the facsimile systems, a picture is broken into separate picture elements, the elements being transmitted to a distant recorder where they are reassembled into their original positions to form a copy of the original. By picture is meant not merely photographs but any other form of printed or written material.

The transmission and recording of facsimiles involve three distinct operations. First, the picture must be scanned to break it up in some orderly manner into discrete elements or dots of varying shade. Second, the elements must be transmitted to a recorder by means of signals representing the electrical equivalents of the picture elements, and finally the signals must be translated in a recorder to a printed copy by a reversal of the scanning process. Since the timing of the received signals must agree exactly with the timing of the recorder, some method of synchronization is required.

Various forms of facsimile scanners are know but regardless of the optical-mechanical nature of the device, it in every instance includes some means to project a small spot of light on the subject picture to be transmitted and to gather the reflected light from the subject into a photosensitive device. The signals generated in the photo-sensitive device by the varying light values reflected from the copy are then either amplified directly or processed in other ways to produce electrical signals of a type suitable for the particular application.

Of the many recording methods heretofore known, the most generally used are the photographic technique, wet or dry electrolytic recording, and carbon paper recording. In recording photographically, a sensitized paper is wrapped on the surface of a drum and is scanned by a spot of light whose intensity or size is varied to record the different values of picture density. This technique must of course be carried out in the dark and the speed of recording is materially limited by the sensitivity of the film. In wet or dry electrolytic recording, a chemically treated surface is used which turns dark when an electrical current is passed therethrough. The treated paper is scanned by a stylus contact and it may be darkened by current at each black-indicating signal, thereby reconstructing the facsimile picture. In carbon recording, a scanning stylus is moved across carbon and white papers wrapped on a drum, the stylus being moved down in response to signals for black and moved up for white-indicating signals.

In all of the known recording techniques, the recording or writing speed is subject to mechanical limitations and in some instances to chemical limitations as well. Consequently while it is possible to increase the scanning speed at the transmission end by the use, for example, of a flying spot scanner, such increase of transmission speed cannot be tolerated in that it exceeds the writing limits of the conventional recorders.

Figure 1:
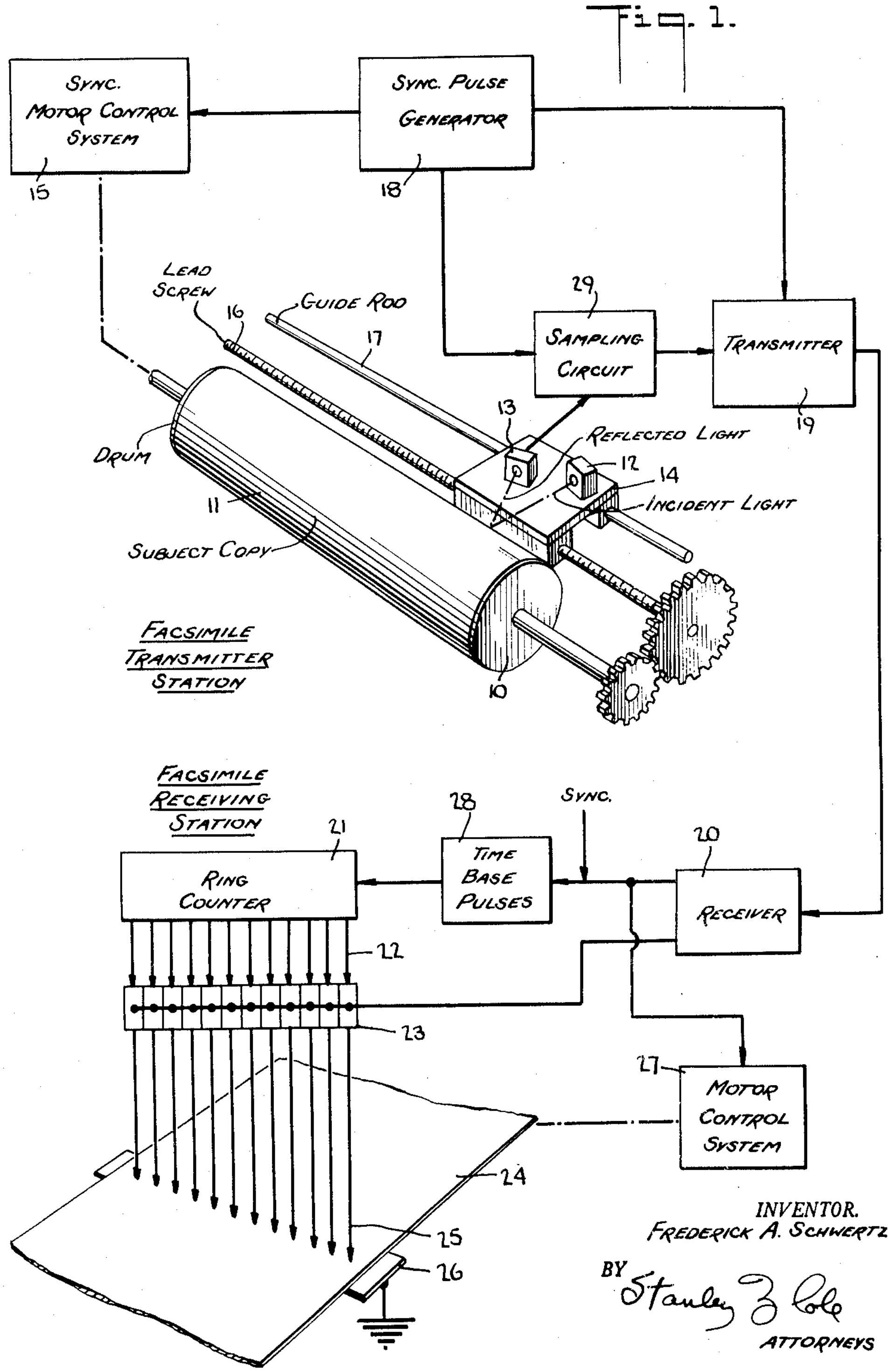
FIG. 1 is a schematic diagram of an electrostatic facsimile system in accordance with the invention.

However, in an electrostatic facsimile recorder in accordance with the invention, the recording apparatus is substantially free of inertia and recording may be carried out at extremely high speeds far above the limits of conventional devices. As shown in FIG. 1, at the transmitter end of the system there is included a facsimile optical-mechanical scanner designed to project a small spot of light on the subject copy and to detect the reflected light from the copy. The transmitting scanner comprises a drum 10 upon which the original picture copy 11 is wrapped, an an optical system including a light source or lamp 12 arranged to project a small spot of light on the surface of the paper. Light reflected from the copy is detected by a photocell or a photomultiplier tube 13, the lamp 12 and tube 13 being both fixedly mounted on a movable carriage 14.

The drum is rotated by means preferably of a synchronous motor 15. The shaft of the drum is geared to a lead screw 16 on which one side of carriage 14 is threadably supported, the other side being slidably supported on a guide rod 17 parallel to the lead screw whereby the carriage is adapted to traverse the drum. Thus, as the drum revolves, the lead screw is turned simultaneously and the carriage is shifted across the drum to effect a scanning operation. The gearing arrangement is such that the optical system on the carriage is moved relative to the drum, the width of one scanning line. The entire subject is thus gradually passed under the scanning spot.

In effect, regular lines are ruled across the copy by the spot of light, there being a predetermined number of scan lines per inch. Signals are generated in the phototube 13 representing each small area as it is encountered. The light reaching the phototube will vary in intensity by the different areas of black, gray and white that may be presented to view, the phototube output being minimum for pure black and maximum for pure white. While a mechanical scanner has been illustrated for purpose of simplicity, it is to be understood that to carry out high transmission speeds, a sweeping light beam may be generated by a flying spot camera or other known high speed light-scanning means.

In every facsimile system it is necessary that the recorder follow the scanner over the paper to produce a distortion-free record. Accordingly, there is provided a pulse generator 18 which acts to apply synchronization pulses to the motor control system 15 for the scanner, each line of scanning being initiated by a pulse. The pulses are also sent out by a transmitter 19 to the recorder.

The output of the phototube 13 is amplified and then fed to a sampling circuit 29 whose operation is also triggered by the sync pulse from generator 18, the sampling circuit acting periodically to sample the instantaneous values of the phototube signal output in the course of each scanning line. If at a particular instant of sampling, the light spot strikes a white area, an output pulse of large magnitude will be produced, and if the area is black, no output pulse will be developed. For intermediate shades of gray, smaller pulses will be produced at the output of th sampler. Thus for each scanning line, the sampling circuit will yield a train or stream of pulses representative of the scanned light values.

The output of the transmitter 19 is fed by wire or radio-signalling means to the input of a facsimile receiver 20 which acts to detect the incoming signals and to segregate in separate output channels the sync pulses from the picture pulses. The sync pulses are applied to a ring counter 21 having a plurality of stages and output lines 22 therefor, each output line being connected to one input of a dual-input gating or coincidence circuit 23 which may be of standard design. The picture pulses yielded by receiver 20 are applied simultaneously to the other input of the gating circuits 23. The gating circuits each include an output circuit in which an output pulse is developed only when incoming pulses are coincident in both input circuits.

An insulating web 24 is provided above which is fixedly supported an array of point electrodes 25 serially aligned in a transverse row across the web. Positioned below the web is a grounded metal plane 26 in parallel alignment with the array of electrodes. Web 24 is formed of any dielectric substance having a sufficiently high resistance under conditions of use to hold an electrostatic charge for a period permitting subsequent utilization of the image by transfer to another surface or by development. Among the materials suitable for this purpose are polyethylene, cellulose acetate and plastic coated papers.

The electrodes 25 are held stationary, whereas the web is moved relative thereto at a rate corresponding to that of the picture 11 on the scanning drum 10. This is accomplished by a motor control system 27 of any standard design whose operation is synchronized with that of the drum by means of the sync pulses obtained from the output of the receiver 20. In practice, web 24 may be wound off a grounded metal drum whose rotation is synchronized with the scanning drum in a manner conventional in the facsimile art.

The ring counter 21, which may be of the type well known in the electronic computer art, has the characteristic that at any given instant only one of its output lines 22 is at a high potential relative to the remaining output lines. The shift of the high potential from one line to the adjacent line occurs each time an input pulse is fed to the ring counter. In effect then the high voltage is propagated from line to line down the counter in response to a train of incoming pulses, and on reaching the last stage the cycle of operation begins all over again.

Incoming pulses at a uniform rate corresponding to the frequency rate of sampling circuit 29 are supplied to the counter 21 by means of a time base pulse generator 28, the generator being synchronized by the sync pulses produced in the output of receiver 20 whereby the sync pulse initiates the counter cycle.

The gating or coincidence devices 23 will therefore have the high voltage timing pulses from counter 21 applied to one input thereof in a sequence which begins at the commencement of a line scan and terminates at the conclusion of the scan. The gating device will be actuated to produce an output pulse only when a counter pulse and a picture pulse is simultaneously present therein.

Since the picture pulses are produced by the sampling circuit 29, and the periodicity of the sampling circuit is synchronized with that of counter 23 by the sync pulse generator 18, if it is assumed that a picture pulse is produced at each instant of sampling, then the gating devices will be actuated in direct sequence. But, in reality, picture pulses are yielded in accordance with the light values on the scanned line, hence the gating pulses will be selectively actuated to provide outputs which reflect the light values. In other words for each scanning line, as timing pulses are applied in sequence, only certain gates are activated to produce an output pulse whose intensity depends on the related picture value.

A pulse applied to one of the point electrodes 25 and the grounded plane 26 causes an electrostatic image of the point to appear on the insulating web 24. Depending on the polarity of the applied pulse, the electrostatic image is either positively or negatively charged. In either case, the image may be rendered visible by cascading over it an oppositely charged pigment or plastic powder, called a toner.

A charge pattern is formed on the insulating web when a field discharge is produced in the air gap between the insulating medium and the pulsed point electrode. The nature of this field discharge is such that when critical stress is attained, ions which normally are present in the gap are accelerated into collisions with nearby molecules, thereby generating additional ions which collide similarly with molecules to create more ions, this action being cumulative. Charges are also released from the surfaces defining the gap by collisions with these surfaces by the moving ions. The travelling ions so produced deposit on the surfaces controlled by the electric field.

To reduce the voltage requirements for effecting a field discharge, the web may be pre-stressed or pre-charged in the manner described in the copending application Serial No. 623,327, filed November 20, 1956, entitled "Electrostatic Recording of Information," now abandoned.

Inasmuch as a white area in the scanned line at the receiver produces an output pulse and a black area does not, the corresponding electrode for the white area on the web 24 will be pulsed whereas the corresponding electrode for the black area will not. Consequently when developing the charges on the web, a negative image will be produced from the original copy. To provide a positive, all that need be done is to reverse the phase or polarity of the sampling circuit 29 so that pulses are produced responsive to black areas and no pulses are produced for white.

In this manner a dot charge pattern will be generated on the web which is in effect a half tone of the original copy. The dot spacing or number of dots per inch on the scan line is determined by the number of electrodes used and their spacing, a like number of gating devices and associated counter lines being entailed. The web 24 moves in a direction normal to the point electrode system 25 at a rate synchronized with the scanning rate on the scanner. Since there are no mechanical or chemical limitations involved in impressing the dot charges on the web representative of the picture values, recording may be carried out at extremely high speeds.

After the web 24 is electrostatically charged with the picture values and the web has been moved to cover all of the scan lines, the web may be removed from the electrode structure and developed and fixed in a manner customary in the xerographic art. Development is accomplished by the deposition of finely divided powder on the surface of the web, the powder adhering to the charged areas. Thereafter the charge pattern is fixed by fusing the powder on the surface of a print to which the powdered pattern has been transferred. A continuous system may be used in which recording, developing and printing are carried out concurrently with an endless web belt on which the charges are erased after use. A detailed description of the xerographic development and fusing technique and the apparatus entailed therein may be found in the patent to Carlson 2,297,691.

Figure 2:
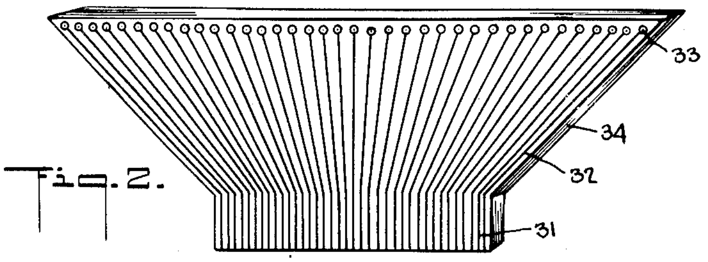
FIG. 2 shows schematically a preferred embodiment of a point electrode structure for use in the facsimile system illustrated in FIG. 1.

As shown in FIG. 2, the electrode structure for recording may be constituted by a dielectric base 34 on which closely spaced conductive electrodes 31 are formed by parallel wires of fine gauge, the electrodes being integral with leads 32 ending in terminals 33 for connection to the gating devices. In this manner a large number of dots per inch may be produced with the recording apparatus. The formation of this electrode structure may be accomplished by the printed circuit technique.

Many forms of storage and memory systems have been proposed for use in digital computing devices. A memory system is any means for the temporary or permanent storage of information by displacing in time various events which depend on the same information. Electrostatic storage systems of the type heretofore known are of four basic types generally referred to as the surface-distribution, the holding beam, the barrier grid and sticking-potential types. In each of these known types, electrostatic recording is effected by an electron beam generated in a cathode-ray tube, the beam impinging on a fluorescent screen or on a specially formed target electrode. An electrostatic memory device in accordance with the invention obviates the need for a cathode-ray tube and effects recording in air without special tubes.

Figures 3, 4:
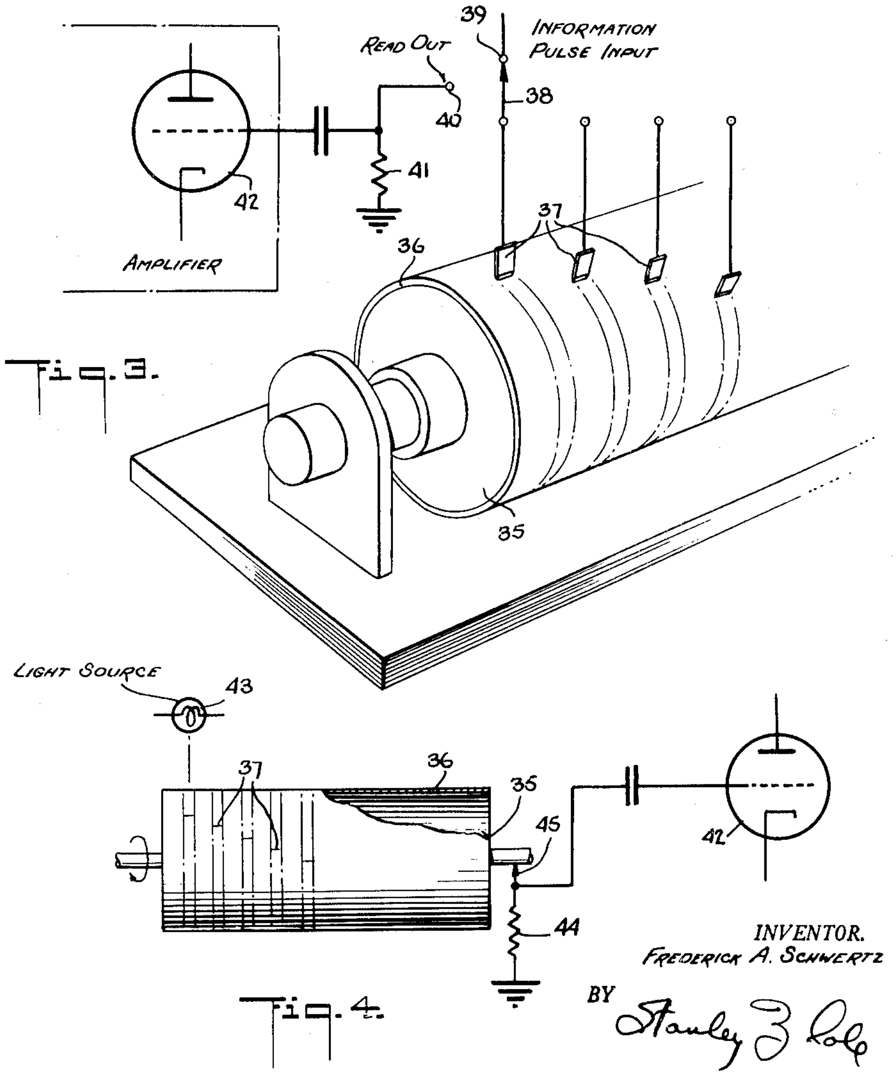
FIG. 3 illustrates in perspective one embodiment of an electrostatic memory device in accordance with the invention.
FIG. 4 shows a modified form of an electrostatic recording device in accordance with the invention.

FIG. 3 shows one preferred embodiment of an electrostatic memory device in accordance with the invention, the device comprising a cylindrical metal drum 35 whose surface is coated with a thin insulating layer 36 which may be either organic or inorganic in nature. Means are provided to rotate the drum at a uniform rate. Electrodes 37 are staggered around the drum and may serve for both reading and recording. The information stored takes the form of electrostatically charged regions on the surface of the drum, each electrode forming a charged circumferential track. External switching circuits act to select the proper electrode and the specific operations.

The electrodes 37 are preferably of razor blade sharpness, about 0.01 inch wide and are disposed in close proximity to the coated surface, say, about 0.001 inch thereabove. As the drum revolves at a uniform speed, alternative positive and negative pulses may be applied to the electrode to impose positive and negative charge patterns on the dielectric surface 36. Thus the binary digits "0" and "1" may be represented by positively or negatively charged regions, or conversely. It is also possible to charge the drum, say positively to a uniform potential and to indicate the binary digit "1" by a relatively negative area and a "0" by the absence of a "mark."

Erasure may be obtained in a manner analogous to that in magnetic storage drums, that is, by writing out the original information with a constant high frequency voltage applied to the electrode, thereby placing the track at a uniform potential in readiness for a next recording.

The charge patterns impressed on the drum may be sensed or "read" by the same electrode used to put down the original charge pattern. Thus a selector switch 38 is provided adapted to connect the electrode 37 to a binary pulse information source at terminal 39 or to a play-back terminal 40. During play-back the electrode 37 is connected to ground through an output resistor 41. As the recorded track on the drum moves by electrode 37, the charges on the track induce a current which flows through resistor 41 and the resultant voltage drop thereacross is applied to the grid of a vacuum tube 42 and thus amplified.

In the embodiment of the storage drum shown in FIG. 4, the drum 35 is coated with a photoconductive insulator 36 and instead of using the recording electrodes 37 as play-back devices a beam of light is provided from a source 43, the beam being directed at the electrostatic track to be played back. Since the track is formed of photoconductive material, the impingement of light thereon releases the stored charges, the resultant current flowing through an output resistor 44 electrically connected to the main storage drum 35 by means of a brush 45 engaging the shaft thereof. This feature may be of particular value in some applications if, for example, it is desired to read out serially all of the information recorded on the drum.

It is also possible with electrostatic memory drums shown in FIGS. 3 and 4 to render the stored information visual by developing the latent electrostatic image with the aid of techniques well known in the xerographic art. The drum shown in FIG. 4 may also be used to store pictures. This is accomplished by the use of a xerographic technique to form a charge pattern of the image on the photoconductive layer 36 on the drum. Facsimile information may be devised from the drum and transmitted by scanning the drum with a light beam and detecting the charge which leaks out of the drum through the grounded resistor 44.

In the copending application entitled "Electrostatic Recording of Information" there is disclosed an image-forming process in which shaped electrodes, symbols or other characters are impressed as electrostatic charges on an insulating web which is pre-stressed to a condition below the critical stress value. Transfer of the image from the shaped electrode is effected by the use of a relatively small triggering pulse which raises the electric field above critical stress to produce a field discharge. This discharge action in the space between the shaped electrode and the insulating web gives rise to the formation of an electrostatic charge pattern of the symbol on the web.

Figures 5, 6, 7, 8, 9:
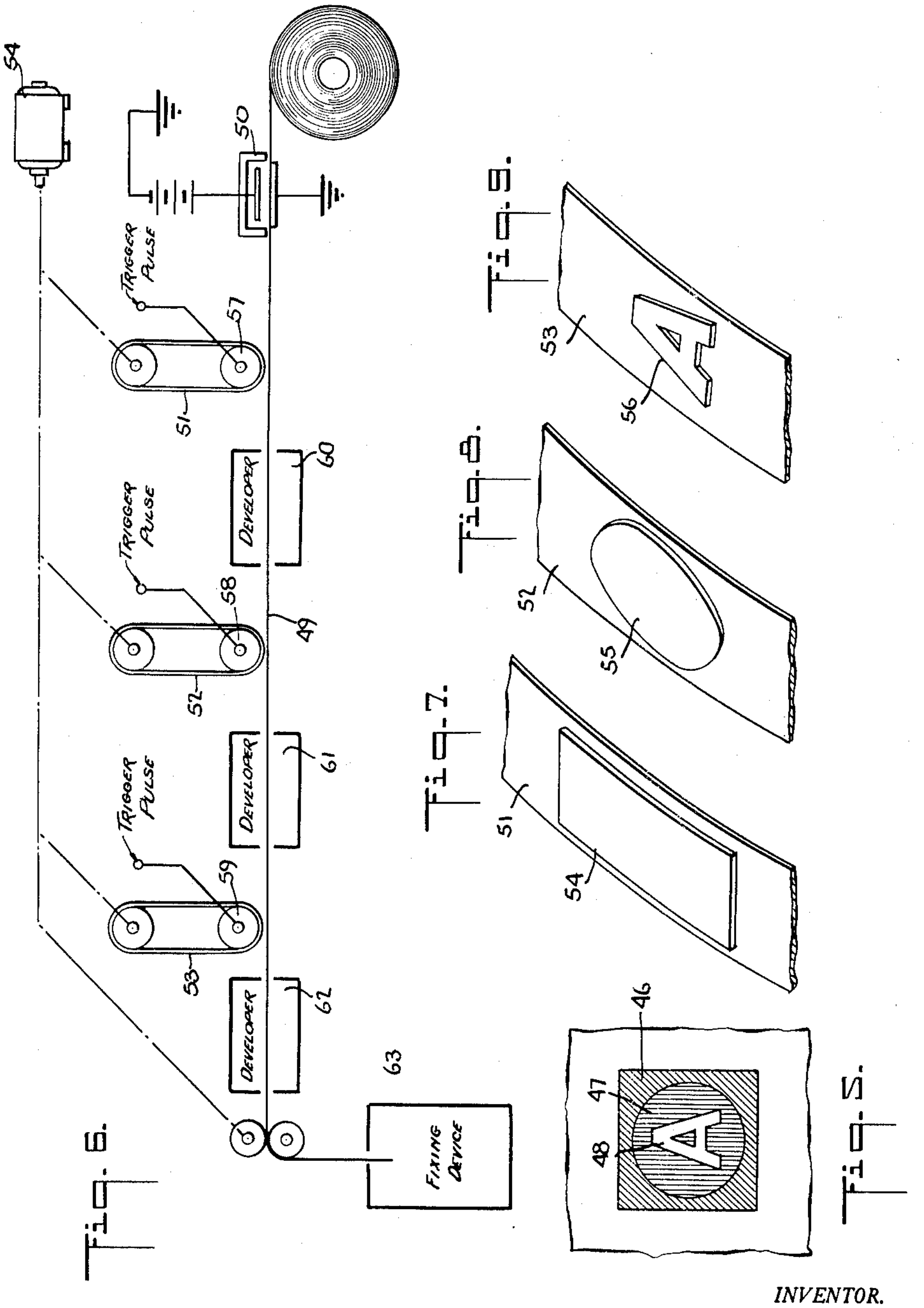
FIG. 5 illustrates the format created by the multiple image electrostatic system shown in FIG. 6.
FIG. 6 shows in schematic form a multiple image electrostatic system in accordance with the invention.
FIG. 7 shows in perspective one recording band for use in the apparatus shown in FIG. 6.
FIG. 8 shows in perspective a second band for use in conjunction with the system in FIG. 6.
FIG. 9 shows in perspective a third band for use in conjunction with the system illustrated in FIG. 6.

In accordance with another aspect of the invention, an electrostatic recording device is provided adapted to impress overlapping forms or symbols on an insulating web to produce effects such as are shown in FIG. 5 wherein the format is constituted by a square 46 on which is superposed a circle 47 and an alphabetical character 48. These elements are merely by way of example and it is to be understood that various formats may be created by the device.

To create the format, an insulating web 49 as shown in FIG. 6 is first pre-stressed by a charging device 50 which may be in the form of an ionization chamber or a corona-producing means, the web moving under a succession of three endless belts 51, 52 and 53 disposed at spaced positions, the web and belts being driven by a common motor 54.

Each endless belt, as shown separately in FIGS. 7, 8 and 9, has attached thereto on the exterior face a flexible electrode. Belt 51 has an electrode 54 which is shaped as a square, belt 52 having an electrode 55 shaped as a circle and belt 53 having an electrode 56 shaped as the letter A. The electrodes are provided with suitable terminals or contact surfaces which lie on the interior face of the belt so that when the portion of the belt carrying the electrode engages the lower rollers 57, 58 and 59, respectively, electrical contact is made permitting the application of a triggering voltage to the electrode.

Since the metal electrode pattern is flexible, it may be rolled into contact with the web a line at a time and thereby ensure good charging contact over the entire expanse of the pattern. The triggering or ignition voltages to the electrodes on the different belts are successively applied in a manner such that when the electrode 54 on belt 51 moves into operative position with respect to the belt, the electrode is triggered to impress a charge pattern on the web, and when this charged area appears below belt 52, electrode 55 is triggered, this operation being repeated for belt 53.

After the charged web leaves belt 51, the charge region is developed in a powder device 60 of conventional design, after the web leaves belt 52, as it passes through a second developing tank 61 and after leaving belt 53, it passes through a developing device 62. Thus by using powders of different colors in the developing tanks, a multicolor format may be produced. Finally, the web enters a fixing device 63 where the developed image may be transferred and fused onto a print surface in the usual manner.

The endless belts may contain a series of flexible shaped electrodes thereon, and by properly timed ignition voltages, any one of the patterns may be selected at will for recording. Thus each belt will constitute a reservoir of patterns.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An electrostatic memory device comprising a rotary drum having a layer of photoconductive material coated thereon, a plurality of relatively broad electrodes each having a relatively sharp edge disposed in proximity to the periphery of said drum, said elements being arranged circumferentially with respect to said drum in staggered relation and having their edges lying in parallel to the longitudinal axis of the drum so that each covers a separate area of said drum surface, recording means to apply pulsed information to said electrodes to form circumferential tracks on said layer having small discrete charged areas thereon in accordance with said information, a source of electrical information pulses, and play-back means including means to direct a light beam of small enough size that it can only expose one discrete, charged area at any one time on a photoconductive track to discharge same through said drum to ground and means to detect the current flow produced by said discharge to ground.

2. An electrostatic memory device comprising a cylindrical drum including a conductive layer and an outer peripheral photoconductive layer, said drum being journaled for rotation about its longitudinal axis, means to rotate said drum about said axis, recording means including at least one electrode and a source of voltage pulses connected thereto, said recording means being adapted to form electrostatic charge patterns representative of information to be stored in narrow circumferential tracks on the photoconductive layer of said drum by electrical discharge and playback means including means to successively expose small surface areas of one of said tracks on said photoconductive layer at a time to actinic electromagnetic radiation, electrical circuit means connecting the conductive layer of said drum to ground so that when said actinic electromagnetic radiation strikes a charge bearing area of said photoconductive layer an output current flows through said electrical circuit means to ground and means to detect current flow in said circuit means to provide serial readout of said stored information in one track at a time whereby the time of actuation of the readout current detecting means is indicative of the position in which information was stored on the track being read out.

3. An electrostatic memory device comprising, a recording member made up of a photoconductive insulating layer on an electrically conductive substrate, recording means including at least one electrode and a source of voltage pulses connected thereto, said recording means being adapted to form electrostatic charge patterns on discrete areas of said photoconductive insulating layer positioned so as to represent information to be stored and playback means including means to expose individual ones of said discrete areas of said photoconductive insulating layer to actinic electromagnetic radiation, circuit means connecting said conductive substrate to ground so that when said actinic electromagnetic radiation strikes a charged area, current flow in said circuit means and means to detect current flow in said circuit means to provide destructive readout of charged areas on said photoconductive insulating layer.

4. An electrostatic memory device comprising a recording member made up of a photoconductive insulating layer on an electrically conductive substrate, recording means including at least one electrode and a source of voltage pulses connected thereto, said recording means being adapted to form electrostatic charge patterns on discrete areas along narrow elongated tracks on said photoconductive insulating layer, said charge patterns being represented of information to be stored and playback means including means to successively expose small surface areas along said tracks on said photoconductive layer with the area covered by exposure at any one time being too small to simultaneously expose two adjacent discrete charged areas on said photoconductive insulating layer, circuit means connecting said conductive substrate to ground so that when said actinic electromagnetic radiation strikes a charged area on said photoconductive insulating layer, current flows through said circuit means to ground and means to detect current flow in said circuit means whereby there is provided destructive readout of said stored information.

References Cited by the Examiner

UNITED STATES PATENTS

| | | | |
|---|---|---|---|
| 882,328 | 3/08 | Lieb | 179—100.2 |
| 1,459,202 | 6/23 | Fuller | 179—100.2 |
| 2,200,741 | 5/40 | Gray | 346—72 X |

(Other references on following page)

OTHER REFERENCES

| | | | |
|---|---|---|---|
| 2,277,013 | 3/42 | Carlson | 95—1.7 |
| 2,451,288 | 10/48 | Huebner | 340—74 |
| 2,497,654 | 2/50 | Begun | 179—100.2 |
| 2,540,654 | 2/51 | Cohen | 340—174.1 |
| 2,726,940 | 12/55 | Buhler | 346—74 X |
| 2,856,462 | 10/58 | Lyon | 340—174 |
| 2,872,529 | 2/57 | Hollman | 179—100.1 |
| 2,890,288 | 6/59 | Newman | 174—1 |
| 2,901,374 | 8/59 | Gundlach | 346—74 X |
| 2,912,592 | 11/59 | Mayer | 340—173 |
| 2,914,403 | 11/59 | Sugarman | 340—74 X |
| 2,944,147 | 7/60 | Bolton | 346—74 X |
| 3,040,124 | 6/62 | Camras | 340—173 |
| 3,057,966 | 10/62 | Heller | 179—100.1 |

FOREIGN PATENTS 734,909 8/55 Great Britain.

OTHER REFERENCES

Pages 504, 509, 7/57 "Dielectric Recorder" by V. C. Anderson, The Review of Scientific Instruments, vol. 28, No. 7.

IRVING L. SRAGOW, *Primary Examiner.*